March 29, 1932.  J. PECHACEK  1,851,261
DRILL BIT
Filed March 1, 1930
FIG.1.
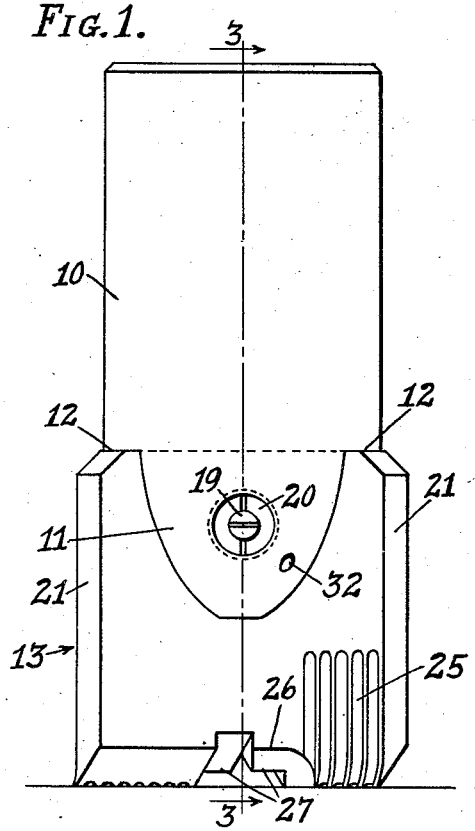
FIG.3.
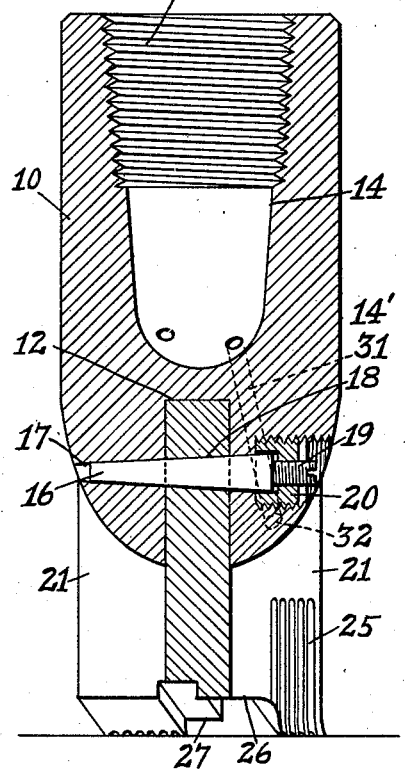
FIG.2.
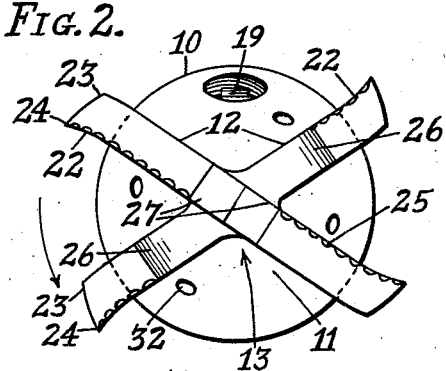
FIG.5.
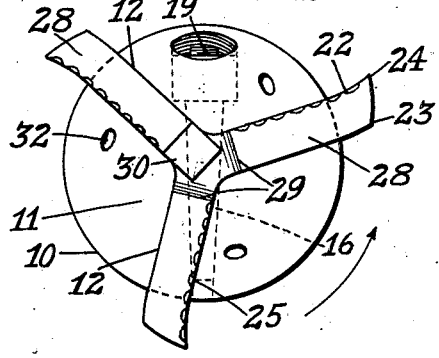
FIG.4.
INVENTOR,
John Pechacek.

Patented Mar. 29, 1932

1,851,261

UNITED STATES PATENT OFFICE

JOHN PECHACEK, OF NORWALK, CALIFORNIA

DRILL BIT

Application filed March 1, 1930. Serial No. 432,389.

My invention relates to drill bits for use with rotary drills in oil well drilling and the like.

The primary object of my invention is to provide an improved bit for rotary drills which is made in two separable parts, a shank and a cutting member, the latter being detachable from the former so that renewals or replacements thereof may be readily made in the interest of economy and efficiency.

A further object is to provide a drill bit of the character described, having either a three-blade or four-blade cutting member, which is so simple in construction as to be manufactured at a comparatively low cost and at the same time is so compact and substantial as to be thoroughly reliable in all kinds of work.

A further object thereof is to provide an attachment for a rotary drill bit which is characterized by the feature that the separate parts can be very readily changed without loss of time.

A still further object thereof is to provide a novel means of rigidly securing in position within the sub or the drill bit the cutter member, so that it cannot, in any manner, become loose or leave the drill bit.

Other objects and advantages will appear hereinafter and, while I show herewith and describe a preferred form of construction, I desire it to be understood that I do not confine my invention to such preferred form but that various changes and adaptations may be made therein without departing from the spirit of my invention as hereinafter claimed.

Referring to the accompanying drawings, Fig. 1 is a side view of a drill bit, embodying the principles and features of my invention, in which a four-blade cutting member is used.

Fig. 2 is a bottom plan view of the bit shown in Fig. 1, looking at the cutting member thereof.

Fig. 3 is a vertical sectional view of the bit shown in Fig. 1, taken on line 3—3 of that figure.

Fig. 4 is a detail view showing in one group the fastening details, showing the upper end of the cutting member, in side elevation, and side views of the pin, screw-plug and locking-screw associated therewith.

Fig. 5 is an end view similar to Fig. 2, of a modified form of bit having a cutting member with three instead of four blades.

Considered more in detail, Figs. 1 to 4 inclusive will be seen to show my improved drill bit as comprising a cylindrical shank 10 having its lower end roundly tapered as at 11 and having deep radial grooves or slots 12, cut in said tapered end and adapted to receive therein the upper end of an X-shaped four-bladed cutting member 13. The upper end of shank 10 is provided with a tapering axial bore 14 which extends somewhat more than half its length and the upper end of said bore is threaded as at 15 to connect with the end of a drill stem.

The length of cutting member 13 is such that it extends approximately half its length beyond grooves 12, in which it is seated, and it is fastened to shank 10 by a tapered pin 16 which is wedged home in the coinciding holes 17 and 18 in shank 10 and cutting member 13, respectively, so as to lock them together. Pin 16 is prevented from working out of holes 17, 18 by a locking screw 19 which extends concentrically through a screw-plug 20 seated in the enlarged end of tapered hole 17 and presses against the larger back end of the pin for the purpose of pressing the pin tightly into the holes 17, 18 as far as it will go in. It will be seen that locking-screw 19 serves the double purpose of holding pin 16 in place and of locking screw-plug 20 so that it cannot turn back and allow the various parts to become loose.

It will also be seen that, after the screw plug 20 has first been screwed home into the bore made to receive the same, as far in as it will go, it will also push the wedge pin 18 into its own seat; now when the screw bolt 19 is turned in the proper direction it tends to force the screw plug and pin in opposite directions; but as the screw plug, acts as an anchor, and cannot move backwardly, it follows that only the key or pin can give and it will be pressed firmly into its seat in the sub and in the shank of the cutter device, so it cannot work loose.

The blades 21 of cutting member 13 are of such width that they project laterally beyond shank 10 to the extent, approximately, of a quarter of their width, measured from the axis of the bit, and the projecting portion is curved forwardly somewhat, in the turning direction of the bit, as shown at 22. Moreover the heel part of the blade edges are cut back as at 23 so as to form a sharp leading edge 24 and their face sides are grooved to some distance above their lower ends as at 25, for the usual hard facing, not shown.

The inner or central portion of two of the diametrically aligned blades are cut away, as at 26, to provide clearance and the other two are cut back and sharpened at the center, as at 27, to cut away central material when in operation. The two pairs of diametrically aligned blades preferably, are made to set at oblique angles to each other as shown in Fig. 2. They may, however, be made to set at right angles as a modification.

As shown in Fig. 5, the blades 28 in the three-bladed cutting member are formed similarly to blades 21 and two of them are cut away at the center, as at 29, while the third is extended to the center and beveled to a cutting edge, as at 30.

The lower part 14' of axial bore 14 serves as a water pocket and ducts 31, leading therefrom to points 32 adjacent the faces of blades 21, are formed in the walls of shank 10. These ducts direct a supply of water toward the lower end of cutting member 13 of the bit.

When the cutting member is broken or becomes so dull as to work inefficiently, the bit may be rendered as good as new by withdrawing it, removing the cutting member and replacing it by a new one. In order to remove the broken or worn cutting member, it is necessary only to unscrew first locking screw 19 and then screw-plug 20, whereupon tapered pin 16 may be driven out of holes 17 and 18 by inserting a pin into the smaller end of the former. Cutting member 13 then can be pulled out of grooves 12 without difficulty.

It will be particularly noted that the X-shaped cutting member 13 has its individual blades so arranged in intersecting planes that when they extend below the sub or drill stock they will divide the sub into four segments. Two of these segments extend in diametrically opposite points and have longer arcs than the other two segments which are also diametrically oppositely arranged. The reason why these long arc segments are provided, is to provide sufficient surface to allow the water holes to conduct water to the adjacent blades, since it is necessary to locate the outer end of one water hole adjacent the screw threaded bore 19a formed in the sub, this bore being formed medially of this long-arc segment while the water hole is formed to one side thereof, and in this manner the water trickling down the water holes may spread along the effective surface of each blade.

Having thus illustrated and described my invention, I claim:

In a device as described the combination of a sub, a tool having a shank shouldered thereinto in axial alignment, said sub being formed at an angle to said shank with a channel, said shank also having a channel, both channels being conical in cross section, registering in complemental manner, pointing towards and opening out of the diametrically opposite parts of the sub, to provide a continuous tapering passage, disposed at right angles to the shank, the widest end of said passage being internally screw-threaded, a conical key projecting into the registering channels and having its wider end projecting into the threaded part of the passage to mount the shank securely in the sub, and having one end spaced short of the outer face of the sub, a screw plug screwed into the threaded portion of the passage and receiving the wide end of the key therein, and a screw bolt tapped centrally thru said key and engaging its wider rear end for the purpose of exerting forward pressure thereagainst to wedge it home in said passage.

JOHN PECHACEK.